United States Patent [19]
Baker

[11] 3,792,307

[45] Feb. 12, 1974

[54] BICYCLE SAFETY LIGHTING GENERATOR-BATTERY SYSTEM

[76] Inventor: Donald L. Baker, 530 Alma Real Dr., Pacific Palisades, Calif. 90272

[22] Filed: July 26, 1972

[21] Appl. No.: 275,196

[52] U.S. Cl.................. 315/77, 315/78, 240/7.6, 315/86
[51] Int. Cl.............................. B62j 5/00
[58] Field of Search ........ 240/7.55, 7.6; 315/78, 79, 315/77

[56] References Cited
FOREIGN PATENTS OR APPLICATIONS

| | | | |
|---|---|---|---|
| 1,015,771 | 8/1952 | France | 240/7.6 X |
| 1,300,560 | 6/1962 | France | 240/7.55 X |
| 186,551 | 12/1963 | Sweden | 240/7.6 X |

*Primary Examiner*—Herman Karl Saalbach
*Assistant Examiner*—Richard A. Rosenberger
*Attorney, Agent, or Firm*—Ralph B. Pastoriza; Pastoriza & Kelly

[57] ABSTRACT

A generator-battery circuit connects to the head and tail lights and in the preferred embodiment of the invention, auxiliary safety lights. The generator is driven from the bicycle wheel to energize the lights when the bicycle is traveling above a given speed. The battery circuit connects in bucking voltage relationship with the generator circuit and includes a series connected diode such that the battery is effectively disconnected when the generator is energizing the lights. On the other hand, when the bicycle slows below the given speed or is motionless, the battery voltage exceeds the generator voltage and energizes the lights. The auxiliary safety lights are mounted on the front and rear portions of the bicycle and provide 360° illumination in azimuth when the bicycle is stationary or traveling at low speeds.

5 Claims, 3 Drawing Figures

PATENTED FEB 12 1974 3,792,307

BICYCLE SAFETY LIGHTING GENERATOR-BATTERY SYSTEM

This invention relates to electrical systems on vehicles and more particularly to an improved safety lighting generator-battery system for a bicycle.

BACKGROUND OF THE INVENTION

Bicycle riding has become increasingly popular during the last several years with an attendant increase in the risks of accidents particularly during evening or night hours. While most bicycles are equipped with standard head and tail lights, it is still not easy for automobile drivers to identify bicycles or even detect their presence. When the bicycle head and tail lights are powered by a battery, they tend to become dimmer after very short use. In the event a generator is utilized driven by one of the wheels of the bicycle, when a bicycle slows down or actually stops such as at an intersection, the generated power is lost and the lights actually become extinguished creating a very serious hazard.

It has been proposed to combine a generator and battery system for energizing bicycle lights so that the battery would be used when the bicycle is traveling at a very slow speed or is motionless. When the bicycle is traveling at normal speed, the generator takes over the job of energizing the lights to conserve battery power.

While the above systems have been effective, they are complicated and usually include relays and the like to effect the switching between generator and battery. Not only can the mechanical type switching relays fail to operate after prolonged use but they represent a drain themselves on electrical energy which might otherwise be utilized for illumination purposes.

Finally, even assuming a properly operating head and tail light system, the unidirectional nature of the head and tail light makes it difficult for the presence of a bicycle moving slowly or stationary to be detected when approaching from the side.

BRIEF DESCRIPTION OF THE PRESENT INVENTION

With the foregoing considerations in mind, the present invention contemplates an improved generator-battery lighting system for a bicycle wherein problems associated with prior circuits particularly with respect to the use of a mechanical type relay are wholly eliminated. In addition, the light system for the bicycle includes in the preferred embodiment of the invention auxiliary safety lights which are automatically energized by the bicycle battery when the bicycle is traveling at a slow speed or is motionless such as would occur when it approaches an intersection. These auxiliary safety lights are designed to radiate 360° in azimuth and also to shine upwardly thereby clearly illuminating the bicycle and rider from all directions.

Briefly, the system includes lighting means with a battery and a generator mounted on the bicycle, the generator being driven by one of the bicycle wheels when the bicycle is in motion. Unique circuit means include a full-wave rectifier connected to the generator and having first and second output leads providing a d-c voltage which increases with increasing speed of the bicycle. The lighting means is connected across the output leads. A single diode in series with the battery defines a series circuit. This series circuit is connected by an auxiliary circuit means across the output leads the orientation of the diode being such that the battery voltage bucks the d-c generator voltage on the first output lead.

With the foregoing arrangement, when the bicycle is traveling above a given speed, the generated d-c voltage is greater than the battery voltage so that the diode effectively blocks the generated voltage from the battery so that the battery is effectively automatically disconnected from the circuit, the generated voltage then energizing the lighting means. When the bicycle is traveling below the given speed or is motionless, the battery automatically takes over the job of energizing either the head and tail lights or the auxiliary safety lights when such are provided.

BRIEF DESCRIPTION OF THE DRAWINGS

A better understanding of the invention will be had by referring now to the accompanying drawings in which.

DETAILED DESCRIPTION OF THE INVENTION

Figure 1:
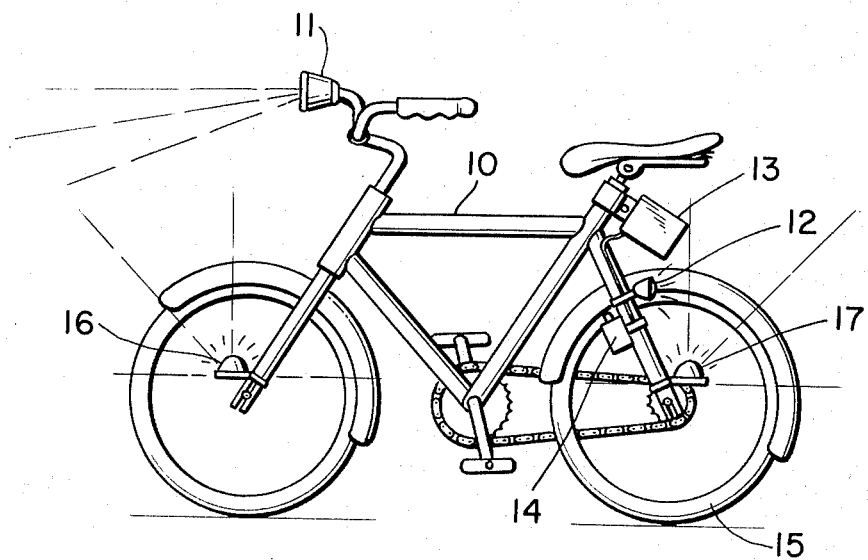
FIG. 1 is a side elevational view of a bicycle incorporating the safety lighting generator-battery system of the present invention.
Figure 2:
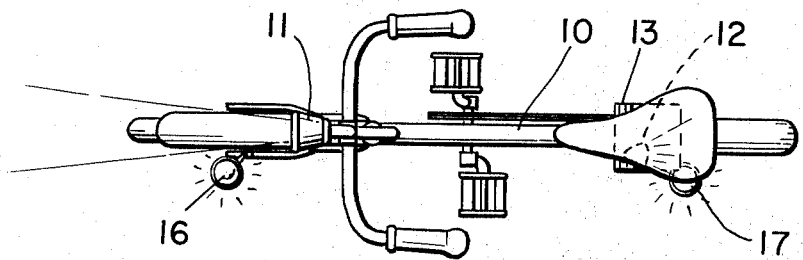
FIG. 2 is a top plan view thereof.

Referring to FIGS. 1 and 2 there is shown a typical bicycle 10 having a headlight 11 and taillight 12. A battery pack 13 is secured to the frame structure beneath the seat of the bicycle as shown. In addition, there is provided a generator 14 also secured to the bicycle frame adjacent to the rear wheel 15 in a position to be driven by the rear wheel 15 when the bicycle is in motion.

In the preferred embodiment of the invention, there are also provided auxiliary lights 16 and 17 secured adjacent to the front and rear portions of the bicycle. The positioning of these lights is such that minimum obscuring thereof by a rider on the bicycle will occur.

With reference to FIG. 2, it will be noted that the auxiliary light 16 and 17 are designed to emit light over 360° in azimuth. These lights preferably also shine upwardly as indicated by the dashed lines in FIG. 1.

The foregoing system is completed by a suitable circuit means in housing 13 interconnecting the battery, generator, and lights in such a manner that when the bicycle is traveling at a speed greater than a given speed, the generator will supply electrical energy for the head and tail lights 11 and 12. On the other hand, when the bicycle slows below the given speed or is motionless, the battery provides energy for the lights. In one embodiment, the battery may supply energy for the head and tail lights when the bicycle is stationary in the event auxiliary lights are not provided. In a second preferred embodiment, the auxiliary lights 16 and 17 are energized when the bicycle slows below the given speed or is motionless.

Figure 3:
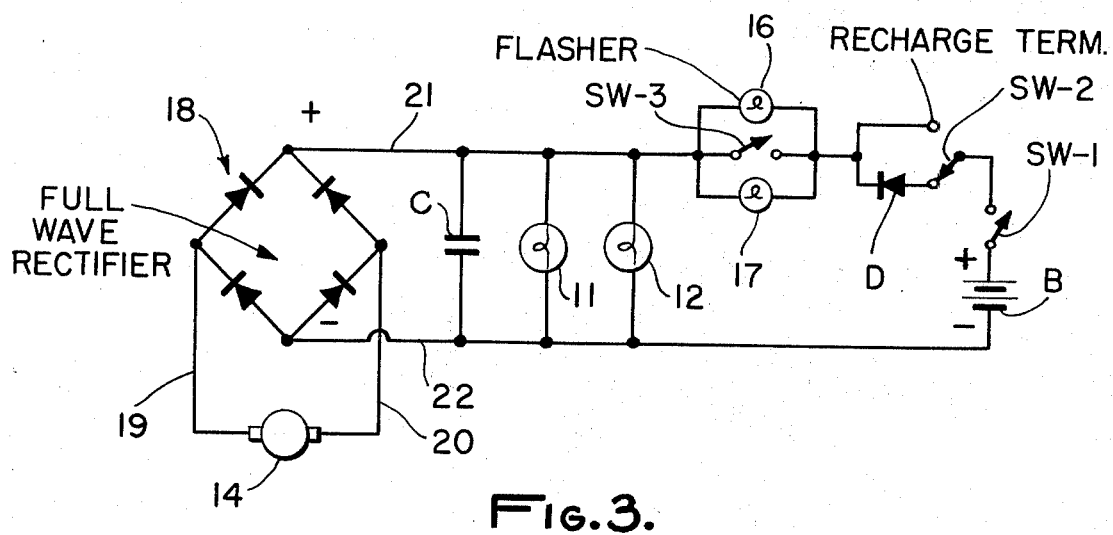
FIG. 3 is a circuit diagram for the lighting system useful in explaining its operation.

Referring now to FIG. 3, there is shown the circuit means for enabling the foregoing functions to be carried out. Referring to the left portion of the drawing, the generator 14 is connected to a full-wave rectifier 18 as by input leads 19 and 20. First and second output leads 21 and 22 from the full-wave rectifier 18 provides a d-c voltage which increases with increasing speed of the bicycle. The lighting means in the form of the head and tail lights 11 and 12 are connected across the output leads 21 and 22. A small capacitor C also connects across the output to smooth out any ripple in the rectification process.

Referring to the right hand portion of FIG. 3, the battery is shown at B and connects through an on-off swtich sw–1, a recharge terminal switch sw–2, a diode D, and a auxiliary circuit switch sw–3 to the first output lead 21 when the switchs sw–1 and sw–3 are closed. The other side of the battery B connects to the second output line 22.

With the switches sw–1, sw–2 and sw–3 all closed, the battery B and diode D constitute a simple series circuit connected directly across the output lines 21 and 22 by the auxiliary circuit. When the switch sw–3 is open, the auxiliary circuit includes the auxiliary lights 16 and 17 in parallel, this parallel circuit then being connected in series between the diode D and the first output line 21. When the switch sw–2 of the auxiliary circuit is moved up to its dotted line position, the diode D is shunted out of the circuit and a direct connection takes place to the output line 21 when the switch sw–3 is closed. The direction of the diode D is such that the battery voltage bucks the generated voltage. This bucking action is also indicated by the polarity signs plus and minus on the output leads 21 and 22 and on either side of the battery B.

OPERATION

In operation, assume first that the switch sw–2 is in its solid line position to connect the diode D in series with the battery B. Assume also that the switch sw–3 is closed. Under these conditions, and assuming that the bicycle is stationary, when the switch sw–1 is closed, voltage from the battery B will be applied across the headlight 11 and taillight 12 to energize these lights. When a bicycle rider starts the bicycle in motion, the rotation of the rear wheel will drive the generator 14 to thereby provide a d-c voltage across the output lines 21 and 22 from the full-wave rectifier 18. This output d-c voltage will increase with increasing speed. As stated, the voltage will buck the battery voltage from the battery B until a first cross-over point is reached when a first given speed is attained. As the speed is further increased, both the generator and battery supply current to the lights until a second cross-over point is reached when a second given speed is attained. At speeds greater than this second given speed, the generator d-c voltage will exceed the battery voltage and will then be blocked by the diode D and be caused to pass directly through the headlights and taillights 11 and 12 thereby providing all of the current for energizing these lights. The diode D thus effectively isolates or disconnects the battery B from the circuit and the voltage of battery B is conserved. So long as the bicycle travels at a speed faster than the referred to second given speed, the generator will supply all electrical energy for the lights.

If now the rider should slow down his bicycle as might be the case when he approaches an intersection, the generated d-c voltage on the leads 21 and 22 will decrease with decreasing speed until the second crossover point is reached where both battery B and the generator supply current. Further slowing to the first given speed results in the voltage from the battery B exceeding the voltage generated by the generator so that the battery then supplies all of the current for energizing the head and tail lights 11 and 12 and will maintain them energized even after the bicycle is motionless.

Assume now that it is desired to utilize the auxiliary safety lights 16 and 17. In this event, the switch sw–3 would be opened. Under these circumstances, the head and tail lights 11 and 12 will still be energized by the output voltage from the full-wave rectifier on the leads 21 and 22 so long as the bicycle is exceeding the second given speed referred to. When the bicycle slows down below the first given speed wherein the battery voltage is greater than the generated voltage, the auxiliary lights 16 and 17 will then be energized by way of a circuit through the filament of the headlight 11. In this respect, the resistance of the filament of the headlight 11 is substantially less than the resistance of the filaments in the auxiliary lights so that the return circuit to the battery passes through the main headlight and this light would not be illuminated or energized to provide light when the bicycle is traveling slowly or is stationary. However, the auxiliary lights will be energized as will be evident from the circuit by current from the battery B. When the rider starts up his bicycle again and exceeds the second given speed, the generator will then take over completely the job of energizing the head and tail lights and the auxiliary lights will be de-energized and effectively out of the circuit as a consequence of the presence of the diode D.

In both of the above described operations there is always a smooth transition from complete battery control to complete generator control, the transition taking place between the given first and second speeds wherein both generator and battery supply current.

It should be understood in the circuit of FIG. 3 that in the event auxiliary lights are not to be used, the switch sw–3 would be eliminated and there simply would be a straight through connection from the diode D to the output line 21. On the other hand, if auxiliary lights are at all times to be used, the switch sw–3 could be eliminated and the auxiliary lights maintained in the circuit.

A further optional portion of the auxiliary circuit consists of the switch sw–2 serving to short out the diode D when thrown to the dotted line position shown in FIG. 3. The purpose for this portion of the circuit is in the event a rechargeable type battery B is employed. Thus, assuming a rechargeable battery is used, during daylight cycling a person may recharge the battery B by throwing the switch sw–2 to the recharge terminal to shunt out the diode D. Under these conditions, generated voltage will be applied directly to the battery B through the shunting circuit for the diode and thus recharge the battery.

The provision of the switch sw–2 is optionable and would only be utilized in the event a rechargeable battery B were used.

An important and unique feature of the circuit is the fact that the head and tail light serve a dual function, to wit: they provide normal illumination and also constitute an integral part of the switching operation so that no auxiliary resistances are required.

From the foregoing description, it will be evident that the present invention has provided a greatly improved safety lighting system for a bicycle. Not only is battery energy conserved as a consequence of the cutting in of the generator for normal cycling speeds but in addition, the swtiching between the battery and the generator is accomplished without the necessity of any mechanical type relay switch. In fact, all of the elements incorporated in this circuit with the exception of the battery and the generator are purely passive in nature and there is no wasted energy in effecting the desired switching operation.

In the preferred embodiment wherein the auxiliary lights are utilized to signal the presence of the bicycle when it is traveling very slowly or is stationary, it will be evident that the lights are visible from any position and because they shine upwardly as well as 360° in azimuth, the rider himself will be readily visible to others in the area.

A further feature of the invention is to make one of the auxiliary lights a flasher type light such as indicated in FIG. 3 for the light 16. Such a flasher type light will cause both the auxiliary lights to flash alternately and thus greater attention is attracted. Finally, the auxiliary lights themselves may be of different colors to identify clearly the front and rear portions of the bicycle.

Obvious changes in the circuitry can be made without departing from the scope and spirit of this invention. For example, the full-wave rectifier 18 may be of the transformer center tap type rather than the four diode bridge type. The invention accordingly is not to be thought of as limited to the exact circuit set forth merely for illustrative purposes.

What is claimed is:

1. A bicycle safety lighting generator-battery system for a bicycle equipped with head and tail lights comprising, in combination:
   a. a battery mounted on a frame portion of the bicycle;
   b. a generator mounted on the bicycle adjacent to a wheel in a position to be driven by the wheel when the bicycle is in motion; and,
   c. circuit means including: full-wave rectifying means connected to said generator and having first and second output leads providing a d-c voltage which increases with increasing speed of the bicycle, said head and tail lights being connected across said output leads; a single diode in series with said battery to define a series circuit;
   d. an auxiliary circuit means connecting said series circuit across said output leads, the orientation of the diode being such that the battery voltage bucks the d-c generator voltage on the first output leads;
   e. auxiliary safety lights secured to front and rear portions of the bicycle and designed to emit light over 360° in azimuth, said auxiliary circuit means connecting said safety lights in parallel with each other and in series between said diode and first output lead, the electrical resistance of the headlight being substantially less than the electrical resistance of the auxiliary lights ;

whereby when the bicycle is traveling above a given speed, the generated d-c voltage is greater than the battery voltage, said diode blocking the generated voltage from the battery, so that the battery is effectively automatically disconnected from the circuit, the generated voltage energizing the lighting means, whereby when said bicycle is traveling at a speed less than said given speed or is motionless, the battery voltage energizes said auxiliary lights through said diode and relatively low headlight resistance.

2. A system according to claim 1, in which said auxiliary circuit includes switch means for shunting said diode so that by closing said switch means, said battery is charged by said generator when said bicycle is traveling at a speed greater than said given speed.

3. A system according to claim 1, in which one of said auxiliary lights is of the flashing type so that the auxiliary lights flash alternately when energized by the battery.

4. A system according to claim 1, in which said auxiliary lights are of different colors from each other to thereby identify the front and rear portions of the bicycle.

5. A system according to claim 1, in which each of said auxiliary lights is designed to emit light upwardly as well as azimuthly.

* * * * *